(12) United States Patent
Huo et al.

(10) Patent No.: US 8,791,670 B2
(45) Date of Patent: Jul. 29, 2014

(54) BATTERY MANAGEMENT SYSTEM AND METHOD OF DYNAMICALLY ALLOCATING CHARGING CURRENT

(75) Inventors: Wei Huo, Shenzhen (CN); Hui Yin, Shenzhen (CN); Bo-Ching Lin, Tu-Cheng (TW); Yan-Ling Geng, Shenzhen (CN); Yan Xu, Shenzhen (CN); Yong-Yong Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 427 days.

(21) Appl. No.: 13/071,441

(22) Filed: Mar. 24, 2011

(65) Prior Publication Data

US 2012/0078435 A1    Mar. 29, 2012

(30) Foreign Application Priority Data

Sep. 24, 2010    (CN) .......................... 2010 1 0289251

(51) Int. Cl.
*H02J 7/06*    (2006.01)
(52) U.S. Cl.
USPC .......................................... 320/163; 320/134
(58) Field of Classification Search
USPC ................................ 320/107, 134, 136, 163
See application file for complete search history.

(56) References Cited

U.S. PATENT DOCUMENTS 5,465,039 A * 11/1995 Narita et al. .................. 320/164
2006/0139005 A1* 6/2006 Niculae et al. ................ 320/132

FOREIGN PATENT DOCUMENTS

CN    1531161 A    9/2004
TW    200421689 A    10/2004

* cited by examiner

*Primary Examiner* — Edward Tso
*Assistant Examiner* — Aaron Piggush
(74) *Attorney, Agent, or Firm* — Novak Druce Connolly Bove + Quigg LLP

(57) ABSTRACT

A battery management system includes a power converter, a first switch, a second switch, a first detecting unit, and a CPU. The power converter is configured to divide current provided by the power supply into a first and a second output current, according to a working current of a system load in a normal state, the first output current is used to power the system load, and the second output current is used to charge a battery unit. The CPU is configured to determine whether the value of current detected by the first detecting unit is greater than a threshold value, and further controls turning on the first switch to power the system load using the first output current, and turn on the second switch to charge the battery unit using the second output current.

8 Claims, 2 Drawing Sheets

BATTERY MANAGEMENT SYSTEM AND METHOD OF DYNAMICALLY ALLOCATING CHARGING CURRENT

BACKGROUND

1. Technical Field

The present disclosure relates to battery management systems, and particularly, to a battery management system and a method of dynamically allocating charging current.

2. Description of the Related Art

Normally, a power supply management system provides some of current for activating and maintaining a system load, and directs the rest of the current for charging a battery. Furthermore, the current used by the load is changing all the time, but the battery is charged with a fixed current value, which is inefficient and may result in battery charge time being longer than desired.

Therefore, there is room for improvement within the art.

BRIEF DESCRIPTION OF THE DRAWINGS

The components in the drawings are not necessarily drawn to scale, the emphasis instead being placed upon clearly illustrating the principles of a battery management system and a method capable of dynamically allocating charging current. Moreover, in the drawings, like reference numerals designate corresponding parts throughout the several views.

DETAILED DESCRIPTION

Figure 1:
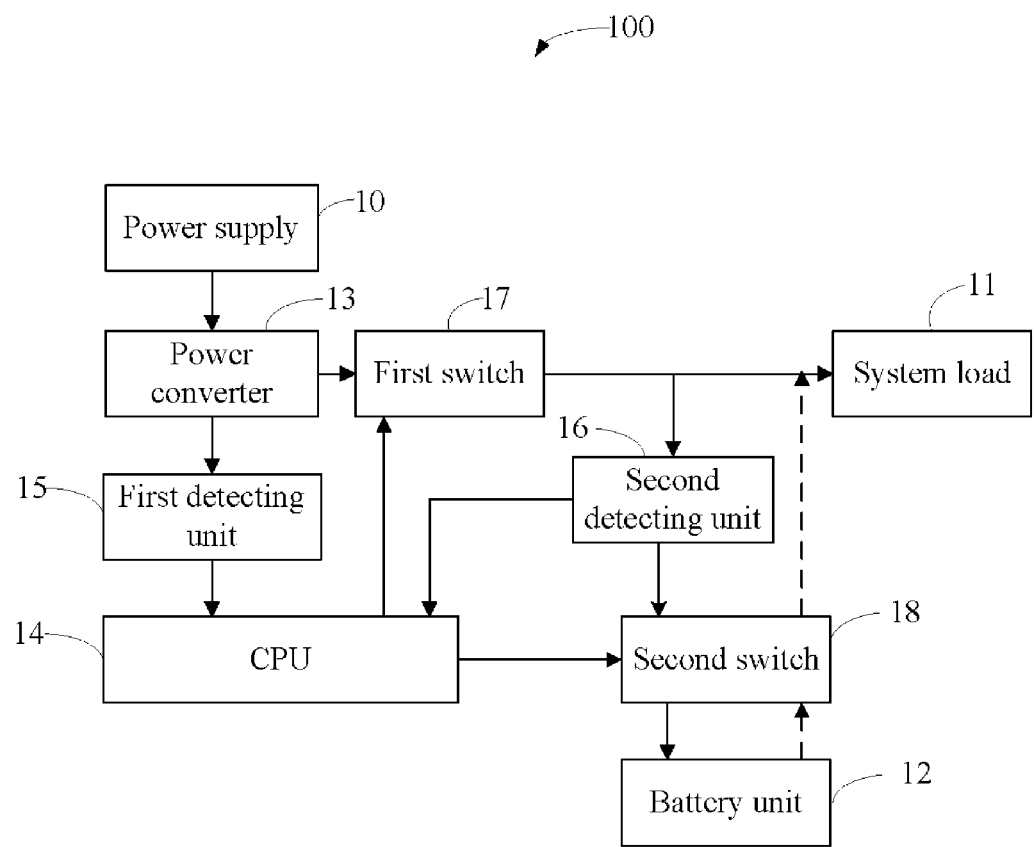
FIG. 1 is a block diagram of a battery management system in accordance with an exemplary embodiment.

Referring to FIG. 1, a battery management system 100 includes a power supply 10, a system load 11, and a battery unit 12. The power supply 10 and the battery unit 12 are both employed to power the system load 11, and the battery unit 12 can be charged by the power supply 10.

The battery management system 100 further includes a power converter 13, a CPU 14, a first detecting unit 15, and a second detecting unit 16. The input of the power converter 13 is connected to the power supply 10, and configured to divide the current generated by the power supply 10 into two output currents (e.g., a first output current and a second output current) according to a working current of the system load 11 in a normal state. The first output current is used to power the system load 11, and the second output current is used to charge the battery unit 12. The value of the first output current is changes with the demand of the system load 11, and the value of the second output current is varies inversely with changes in the first output current. For example, suppose that the working current of the system load 11 in the normal state is 40A and, then the current is divided so that the first output current is 40A and the second output current is 50A. If the system load 11 draws more current, such as 50A, the first output current becomes 50A and the second output current becomes 40A. The maximum value of the current charging the battery unit 12 can be set to equal to the maximum value of the current provided by the power supply 10.

The first detecting unit 15 is connected between the input of the power converter 13 and the CPU 14, and configured to detect the current which is generated by the power supply 10. The second detecting unit 16 is configured to detect the second output current.

The battery management system 100 further includes a first switch 17 and a second switch 18. When the second switch 18 is turned to forward conduction, the second output current is used to charge the battery unit 12, and when the second switch 18 is turned to opposite conduction, current is provided by the battery unit 12 to power the system load 11.

The CPU 14 is configured to determine whether the current detected by the first detecting unit 15 is greater than a threshold value which is a current used to normally power the system load 11. If yes, the CPU 14 controls to turn on the first switch 17 and the second switch 18 in forward conduction, and the first output current is used to power the system load 11 and the second output current is used to charge the battery unit 12. If no, the CPU 14 controls to turn off the first switch 17 and the second switch 18.

Normally, when the charging current is less than a predetermined value, namely, a cut-off current, the battery unit 12 is determined to be full. However, in the battery management system 100, due to the value of the first output current being changeable, the value of the second output current is inversely changes accordingly. The CPU 14 further determines whether the second output current detected by the second detecting unit 16 is less than the cut-off current, and whether the current detected by the first detecting unit 15 is less than the maximum current value provided by the power supply 10 at the same time. If yes, the CPU 14 determines the process of charging the battery unit 12 is to be finished, and turns off the second switch 18, thereby preventing the CPU 14 from mistakenly ending charging the battery unit 12.

Furthermore, if the second output current used to charge the battery unit 12 decreases to zero as detected by the second detecting unit 16, the CPU 14 determines the system load 11 is drawing all the provided by the power supply 10. In such case, the second switch 18 is turned to forward conduction, and the battery unit 12 can provide additional current to the system load 11 as an auxiliary power supply (shown in dotted line section).

Figure 2:
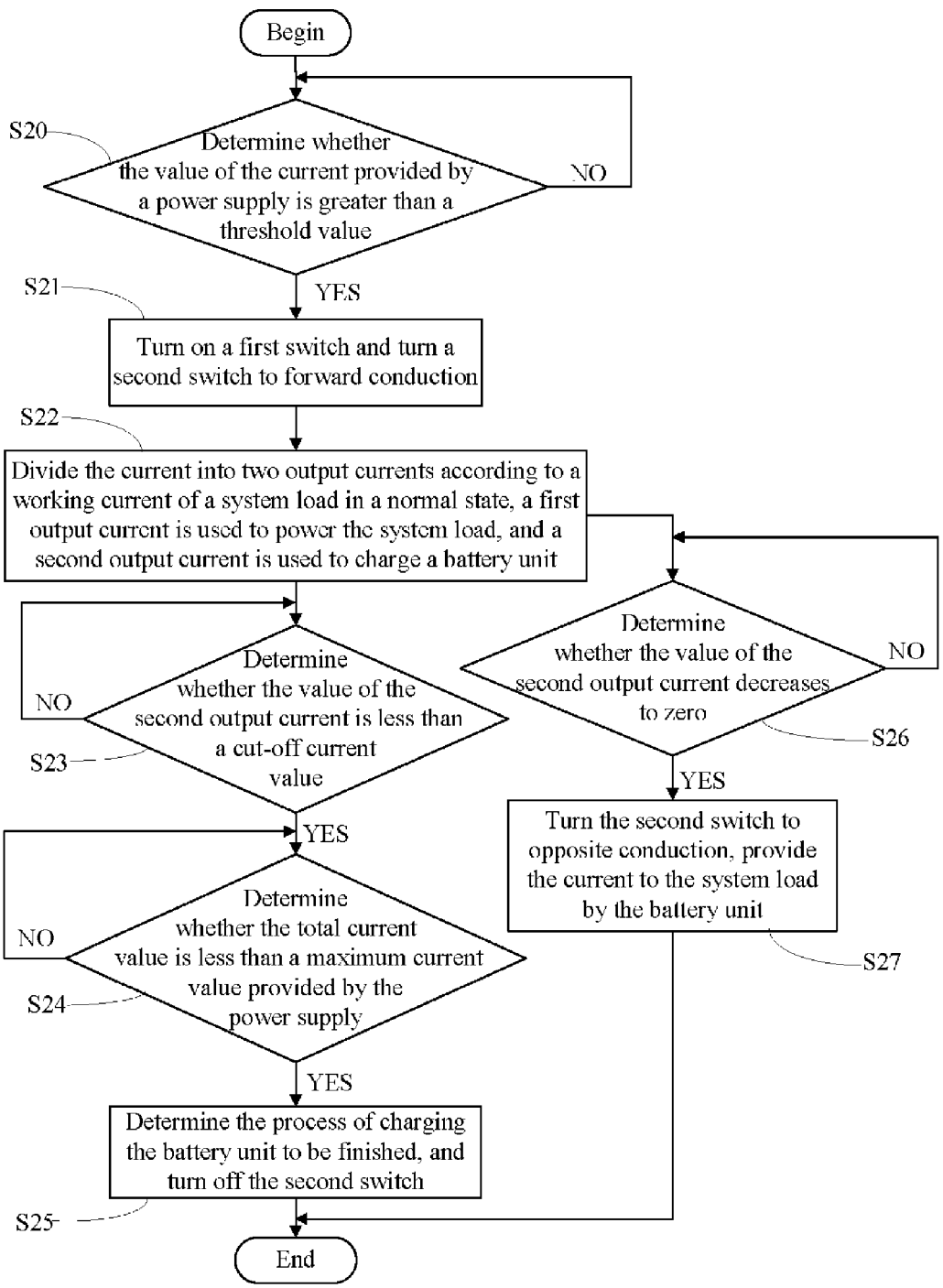
FIG. 2 is a flowchart of a method for dynamically allocating charging current in accordance with an exemplary embodiment.

FIG. 2 is a flowchart of a method for dynamically allocating charging current implemented by the battery management system 100.

In step S20, the CPU 14 determines whether the value of the current provided by the power supply 10 detected by the first detecting unit 15 is greater than a threshold value which is a current used to normally power the system load 11. If yes, the procedure goes to step S21, otherwise, the procedure returns to step S20.

In step S21, the CPU 14 controls turning on the first switch 17 and turning the second switch 18 to a forward conduction.

In step S22, the power converter 13 divides the current into the first output current and the second output current according to a working current of the system load in a normal state.

In step S23, the CPU 14 determines whether the value of the second output current used to charge the battery unit 12 detected by the second detecting unit 16 is less than the cut-off current. If yes, the procedure goes to step S24, otherwise, the procedure returns to step S23.

In step S24, the CPU 14 determines whether the current value detected by the first detecting unit 15 is less than the maximum current value provided by the power supply 10. If yes, the procedure goes to step S25, otherwise, the procedure returns to step S24.

In step S25, the CPU 14 determines the process of charging the battery unit 12 is finished, and turns off the second switch 18.

In step S26, the CPU 14 determines whether the value of the second output current used to charge the battery unit 12 decreases to zero. If yes, the procedure goes to step S27, otherwise, the procedure returns to step S26.

In step S27, the CPU 14 controls the second switch 18 to turn to opposite conduction, the battery unit 12 provides current to the system load 11 as an auxiliary power supply.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A battery management system, comprising:
   a system load;
   a battery unit;
   a power converter for being connected to a power supply, configured to divide current provided by the power supply into two output currents, according to a working current of the system load in a normal state, wherein a first output current is to power the system load, and a second output current is to charge the battery unit, the amount of the first output current being changed according to the demand of the system load, and the amount of the second output current being changed according to the changing of the first output current inversely;
   a first switch;
   a second switch;
   a first detecting unit connected to the input of the power converter, configured to detect the current which is provided by the power supply; and
   a CPU, configured to determine whether the value of the current detected by the first detecting unit is greater than a threshold value, and further controls to turn on the first switch to power the system load by the first output current, and to turn on the second switch to charge the battery unit by the second output current if the value of the detected current is greater than the threshold value.

2. The battery management system as recited in claim 1, wherein the current threshold is a current used to normally power the system load.

3. The battery management system as recited in claim 1, wherein a maximum value of the current charging the battery unit is set to equal to the maximum value of the current provided by the power supply, and the value of the first output current changes with the demand of the system load, and the value of the second output current varies inversely with changes in the first output current.

4. The battery management system as recited in claim 1, further comprising a second detecting unit configured to detect the second output current.

5. The battery management system as recited in claim 4, wherein when the value of the second output current detected by the second detecting unit is less than a cut-off current value of the battery unit, and the current value detected by the first detecting unit is less than the maximum current value provided by the power supply at the same time as determined by the CPU, the CPU determines the process of charging the battery unit to be finished, and turns off the second switch.

6. The battery management system as recited in claim 1, wherein when the value of the current provided by the power supply is less than the threshold value, the CPU is further configured to turn off the first switch and second switch.

7. The battery management system as recited in claim 1, wherein when the second switch is turned to allow conduction, the second output current provided is used to charge the battery unit, and when the second switch is turned to prevent conduction, the current provided by the battery unit is used to power the system load.

8. The battery management system as recited in claim 7, wherein when the value of the second output current decreases to zero at one moment, the CPU determines that the system load is drawing all the provided by the power supply, and controls the second switch to allow conduction, and the battery unit provides additional current to power the system load as an auxiliary power supply.

* * * * *